United States Patent
Johnson

(10) Patent No.: US 8,571,913 B2
(45) Date of Patent: Oct. 29, 2013

(54) SYSTEM AND METHOD FOR MANAGING DATA WITHIN A CALENDARING FRAMEWORK

(76) Inventor: Jeffrey K. Johnson, Spokane, WA (US)

( * ) Notice: Subject to any disclaimer, the term of this patent is extended or adjusted under 35 U.S.C. 154(b) by 1586 days.

(21) Appl. No.: 11/196,986

(22) Filed: Aug. 4, 2005

(65) Prior Publication Data

US 2007/0033085 A1 Feb. 8, 2007

(51) Int. Cl.
*G06Q 10/00* (2012.01)

(52) U.S. Cl.
USPC .................. 705/7.18; 705/7.21; 705/7.24

(58) Field of Classification Search
USPC ............. 705/8, 9, 7.12, 7.13, 7.18, 7.21, 7.24
See application file for complete search history.

(56) References Cited

U.S. PATENT DOCUMENTS

| | | | |
|---|---|---|---|
| 5,070,470 A * | 12/1991 | Scully et al. | 708/112 |
| 5,548,506 A * | 8/1996 | Srinivasan | 705/8 |
| 5,671,361 A * | 9/1997 | Brown et al. | 705/7.23 |
| 5,732,399 A * | 3/1998 | Katiyar et al. | 705/8 |
| 5,842,177 A * | 11/1998 | Haynes et al. | 705/8 |
| 6,101,480 A * | 8/2000 | Conmy et al. | 705/9 |
| 6,408,277 B1 * | 6/2002 | Nelken | 705/7.15 |
| 6,571,215 B1 * | 5/2003 | Mahapatro | 705/8 |
| 7,082,402 B2 * | 7/2006 | Conmy et al. | 705/8 |
| 2002/0120480 A1 * | 8/2002 | Kroeger | 705/7 |
| 2003/0130882 A1 * | 7/2003 | Shuttleworth et al. | 705/8 |
| 2003/0229529 A1 * | 12/2003 | Mui et al. | 705/8 |
| 2004/0098294 A1 * | 5/2004 | Dean et al. | 705/8 |
| 2004/0111307 A1 * | 6/2004 | Demsky et al. | 705/8 |
| 2005/0091098 A1 * | 4/2005 | Brodersen et al. | 705/8 |
| 2005/0108074 A1 * | 5/2005 | Bloechl et al. | 705/8 |
| 2005/0114191 A1 * | 5/2005 | Atkin et al. | 705/8 |
| 2005/0137925 A1 * | 6/2005 | Lakritz et al. | 705/8 |
| 2005/0147130 A1 * | 7/2005 | Hurwitz et al. | 370/503 |
| 2007/0033085 A1 * | 2/2007 | Johnson | 705/8 |

OTHER PUBLICATIONS

Microsoft Project 1995: Ch2 thru Ch5: Creating and Organizing a Schedule, Scheduling Task and Adding People and Equipment to Your Project—by Microsoft Corp.*

* cited by examiner

*Primary Examiner* — Andre Boyce
*Assistant Examiner* — Ernest A Jackson

(57) ABSTRACT

Described are methods and mechanisms for managing data within a calendaring framework. The method includes receiving task data, which is distributed into one or more tasks associated with a category, and receiving time slot data, which defines one or more time slots within the calendaring framework and associates each category with at least one time slot. The method additionally includes determining a location for each task within the one or more time slots that are associated with the same category based on a task prioritization value, and determining a location for each action item within the one or more time slots that are associated with the same category based on the task location determination, an action item prioritization value, and an estimated completion time. The method further includes populating the time slots within the calendaring framework with the action items based on the action item location determination.

18 Claims, 6 Drawing Sheets

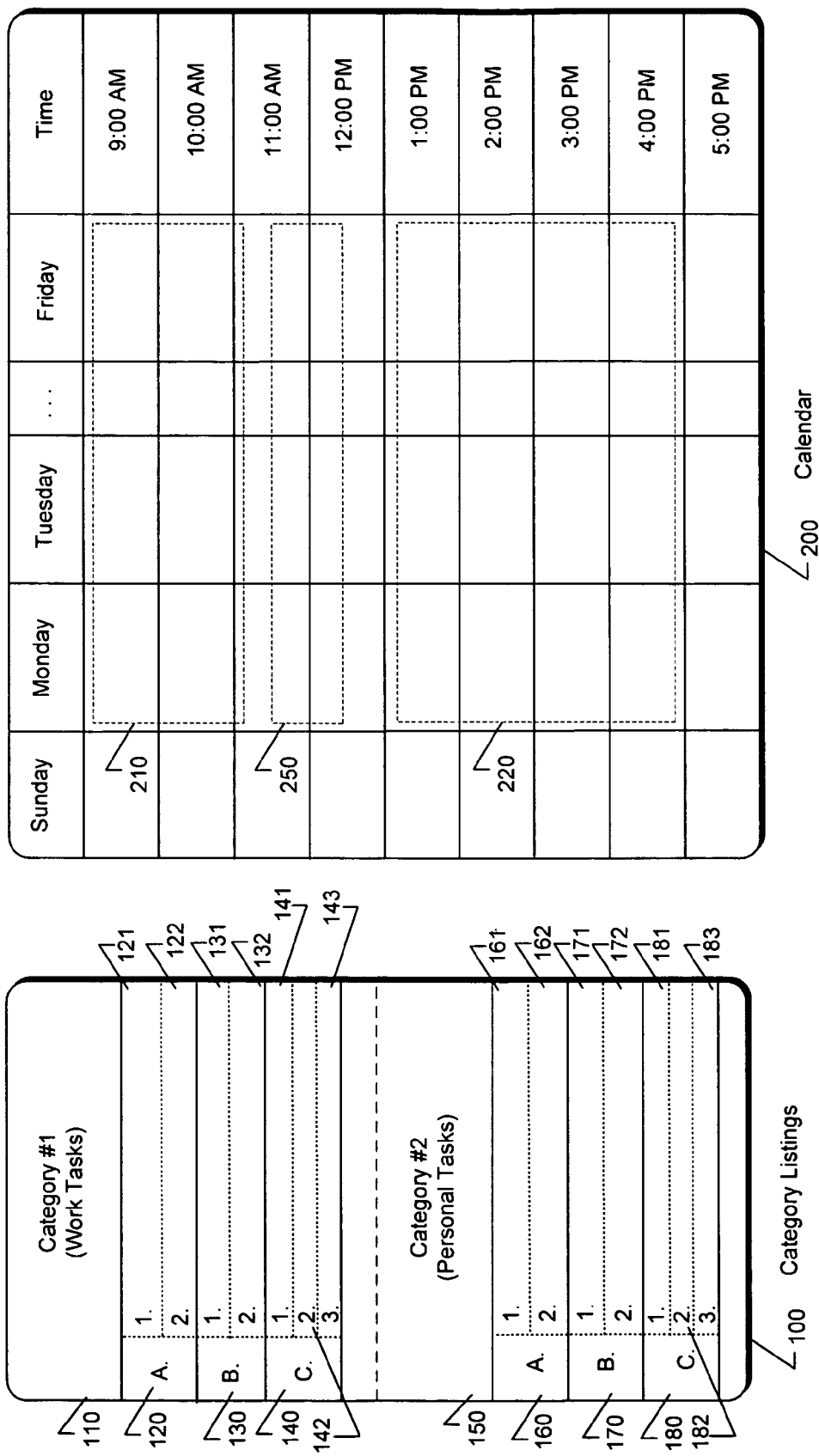

SYSTEM AND METHOD FOR MANAGING DATA WITHIN A CALENDARING FRAMEWORK

BACKGROUND OF THE INVENTION

The invention relates generally to the field of data management, and more particularly to data management within a calendaring framework.

Computing devices allow users to increase efficiency by using any of the conventional software products available in today's market, for example word processing software, spreadsheet software, email management software, productivity software, and the like. For example, conventional productivity programs allow a user to keep a calendar of meetings and task lists. Some advanced productivity programs allow the automated scheduling of meetings by including data in e-mail messages that can automatically create an entry on the user's calendar. Existing productivity programs sometimes allow a user to attempt to automatically schedule a meeting with other individuals if the program has network access to the calendars of those other individuals.

However, existing productivity programs largely ignore the need for a user to allocate time to perform tasks that may need performing. Indeed, with most existing productivity programs, a user's task list action items cannot even be viewed on the calendar at all even if due dates and other date information is provided. An adequate system for prioritizing and scheduling tasks has eluded those skilled in the art, until now.

SUMMARY OF THE INVENTION

The invention is directed at systems and methods for automatically scheduling tasks on a calendar. In one aspect, a method includes receiving task data that includes a category having at least two prioritized action items, receiving time slot data that identifies a time slot on a calendar, and corresponding the time slot with the category. The method further includes automatically scheduling the action items within the corresponding time slot based on the relative priorities of the action items and an estimated time for completion of the action items.

In another aspect, a computer-readable medium storing a computer program to manage data within a calendaring framework includes: computer-readable code to receive task data that includes a category having at least two prioritized action items, to receive time slot data that identifies a time slot on a calendar, and to correspond the time slot with the category. The computer-readable medium further includes computer-readable code to automatically schedule the action items within the corresponding time slot based on the relative priorities of the action items and an estimated time for completion of the action items.

BRIEF DESCRIPTION OF THE DRAWINGS

FIG. 1 is an exemplary user interface dialog screen.
FIG. 2 is another exemplary user interface dialog screen.

DETAILED DESCRIPTION

Figure 3:
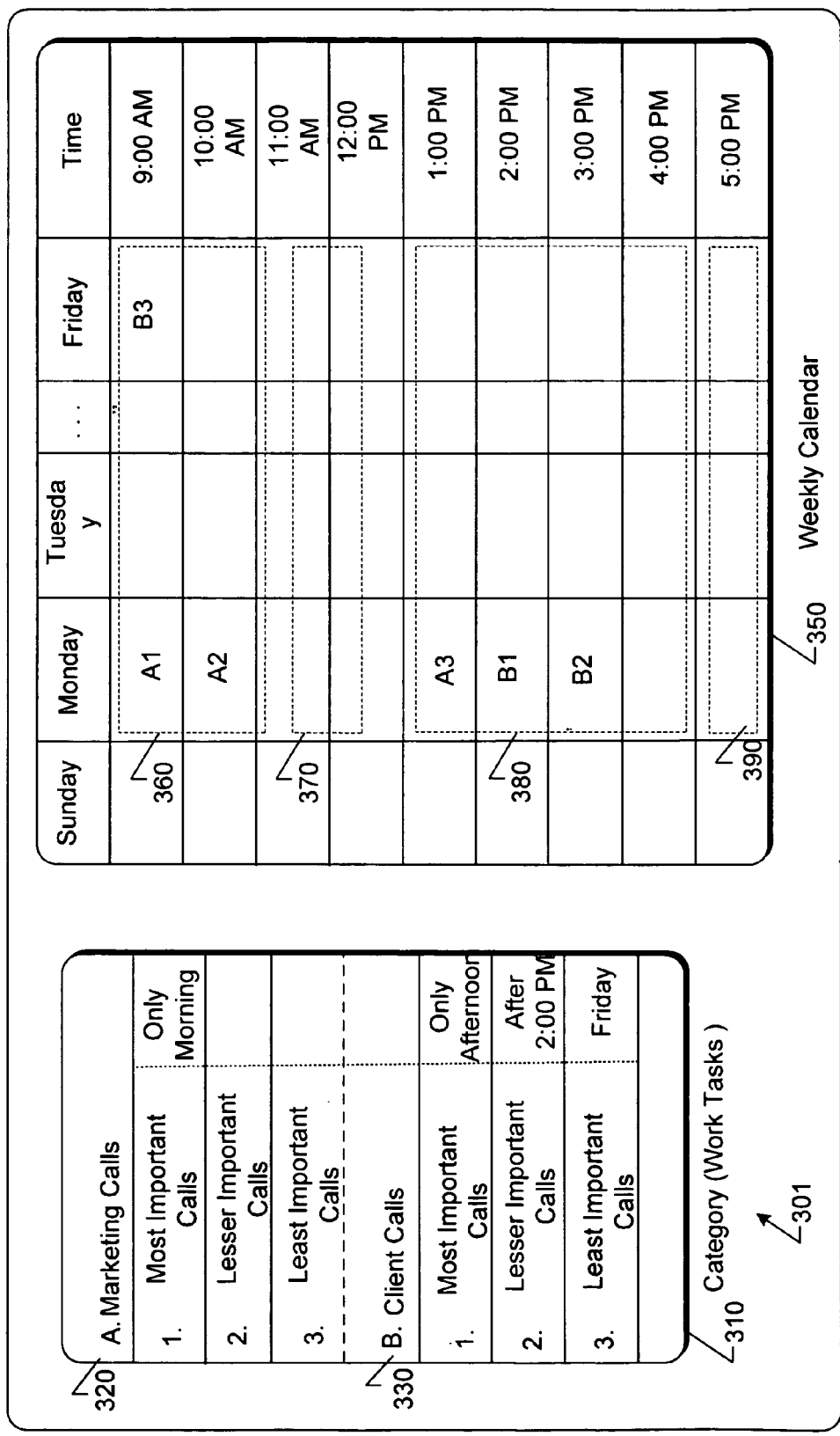
FIG. 3 is yet another exemplary user interface dialog screen.

What follows is a detailed description of various techniques and mechanisms for time management. Very generally stated, the present invention is directed at providing a system for automatically calendaring action items in a task list based on relative priorities and estimated completion times of the action items.

FIG. 1 is an exemplary user interface dialog screen generally illustrating a task list, in accordance with one embodiment of the present invention. In FIG. 1, the task list 100 includes one or more prioritized categories. Each category includes one or more "tasks" that the user needs to perform. Each task may have a priority relative to the other tasks. For instance, if there are three tasks (A, B, and C) then task "A" may have a higher priority than task "B", which in turn has a higher priority than task "C." These priorities are intended as an objective measure of the user's desire to perform certain tasks before other tasks.

Each task includes one or more action items, which are the actual action items of conduct that must be performed to accomplish a task. For instance, if a certain task is created for marketing telephone calls, action items for that task could include each of the individual telephone calls that must be made.

Each action item also includes an estimated time for completion. For instance, if a particular action item is a telephone call, the user's experience may be that telephone calls last an average of three minutes. Accordingly, the user may assign an estimated completion time of three minutes for each action item. Alternatively or in addition, the task itself may have an associated "default" completion time, which is automatically assigned to the task's constituent action items not having an express estimated completion time.

The action items may also include other data, such as the names and other information (e.g. telephone numbers, demographics, referral source, etc.) of the calls to be made to potential clients. The action items may also be prioritized within each task in a manner similar to that described above for the tasks.

By way of illustration, category #1 (110) includes prioritized tasks associated with a user's work responsibilities, such as, marketing telephone calls, client telephone calls, preparation of memoranda, review of documentation, and the like. In this example, category #1 (110) includes work tasks A (120), B (130), and C (140). Each of those tasks further include action items. In this example, work task A 120 includes action item A1 (121) and action item A2 (122), which are prioritized action items relating to work task A 120. Work task B 130 includes action item B1 (131) and action item B2 (132). Work task C 140 includes action item C1 (141), action item C2 (142), and action item C3 (143).

Similarly, category #2 (150) includes prioritized tasks associated with a user's personal responsibilities, such as, personal telephone calls, providing transportation for children, other important personal commitments, or the like. In this example, category #2 (150) includes personal tasks A (160), B (170), and C (180). Personal task A 160 includes action item A1 (161) and action item A2 (162). Personal task B 170 includes action item B1 (171) and action item B2 (172).

Personal task C 180 includes action item C1 (181), action item C2 (182), and action item C3 (183).

Although only two categories are illustrated in FIG. 1, it should be understood that an unlimited number of categories can be used without departing from the spirit of the present invention. For example, task listing 100 may include another category (not shown) that includes a number of personal tasks with a higher priority than the work tasks within category #1 110 as well as other categories with lower priorities (e.g. requested vacation destinations) than category #2 150. Task listing 100 may also include additional components not relevant to the present discussion.

In illustrative operation, a user provides one or more categories as well as tasks within each category to a user interface dialog screen. The user may also provide specific action items to be completed and an estimated completion time for each action item. At some point, the user prioritizes the categories, assigns the tasks to each category, and prioritizes the tasks within each category. The user also assigns the action items to each task and may prioritize the action items within the tasks.

At any point in the process, the user can add, modify, or delete any assignment or prioritization of any categories, tasks, or action items. That is, at any time, the user can modify any categories, tasks, or action items and reprioritize the subsequent list of remaining categories, tasks, or action items. In one embodiment, once the user is satisfied with the categories, tasks, and action items as well as the prioritization of the categories, tasks, and action items the user will have a task listing 100 as described in FIG. 1.

FIG. 2 is an exemplary user interface dialog screen generally illustrating a calendaring program, in accordance with one embodiment of the present invention. The calendaring program exhibits the same general functionality as many conventional calendaring programs, such as the ability to schedule meetings and display those meetings as icons or other representations on the calendar. In addition, the calendaring program includes additional functionality to schedule tasks and display those scheduled tasks, as is described more fully below.

In FIG. 2, calendar 200 allows the user to identify time slots 210, 220, and 250. The time slots may represent any period of time over any given length of hours, days, weeks, months, etc. In this example, calendar 200 currently displays a weekly time schedule including time slot 210 which represents the time from about 9:00 AM until about 11:00 AM, time slot 220 which represents the time from about 1:00 PM until about 5:00 PM, and time slot 250 which represents the time from about 11:30 AM until about 12:30 PM on a daily basis.

Each of the time slots 210, 220, and 250 is associated with a corresponding one of the categories described in FIG. 1, above. More than one time slot may be assigned to the same category to provide additional time available for scheduling a category's tasks and action items. In an example and referring to FIGS. 1 and 2, time slots 210 and 220 are associated with category 1 110 for work tasks. Time slot 220 is associated with category 2 150 for personal tasks.

In illustrative operation, a user is prompted to identify one or more time slots on the calendar 200. The prompt may also include associating the time slots with the categories, such as one or more work categories, one or more personal categories, and the like. At any point in the process, the user can add, modify, or delete any time slot or the assignment of any time slot to any category. In one embodiment, once the user is satisfied with the time slot apportionment and category assignments, the user has a calendar 200 as described in FIG. 2.

FIG. 3 is an exemplary user interface generally illustrating a sample calendar populated with automatically-scheduled, prioritized tasks, in accordance with one embodiment of the present invention. The productivity calendaring application 300 includes a task list 301 and a calendar 350 shown in a "weekly view" format. In FIG. 3, the task list 301 includes only one category, a work category 310, although other implementations could have many different categories. In this example, the task list 301 includes tasks associated with a user's work responsibilities, which could include marketing telephone calls, client telephone calls, work related meetings, and the like.

Each of the work tasks within work category 310 is a prioritized task list, such as work task A (320) and work task B (330). The tasks include specific action items that need to be completed by the user to accomplish that task. Work category 310 is a category associated with a user's work responsibilities and includes prioritized tasks associated with that goal. In this embodiment, work task A 320 is a task associated with a user's work responsibilities that have been assigned the highest priority level, such as, marketing telephone calls. Work task A 320 includes action item A1 (321), action item A2 (322), and action item A3 (323), which are action items relating to work task A 320. Each action item may include, for instance, an estimated completion time and the names and associated data (e.g. telephone numbers, demographics, referral source, etc.) of the calls to be made to potential clients. The action items are presented in a descending order of priority.

In this example, action item A1 321 is a call list that includes the most important marketing calls based on a predetermined assessment of the names on the call list. In one enhancement, action item A1 321 may additionally include the names on the call list as well as special instructions to the productivity calendaring application 300 for scheduling the action item, such as, scheduling this particular action item in morning time blocks only or scheduling this particular action item immediately after lunch. In the case of such a call list, the names on the call list may include telephone numbers or additional marketing data provided by the source of the call list.

Further to this embodiment, work task B 330 is a task associated with a user's work responsibilities that have been assigned the next highest priority level, such as, client telephone calls. Work task B 330 includes action item B1 (331), action item B2 (332), and action item B3 (333), which are prioritized action items relating to work task B 330. These action items may also include, for example, the names and associated data (e.g. telephone numbers, demographics, referral source, etc.) of the calls to be made to existing clients. Again, the action items are presented in a descending order of priority.

On the calendar 350, each of the time slots 360, 370, 380, and 390 has been identified by the user and associated with a category described within the task list 301. In this example, time slots 360 and 380 are assigned as work time slots and are associated with work category 310. Continuing the example, time slots 370 and 390 are assigned as personal time slots and are associated with a personal category (not shown).

In accordance with the invention, the user instructs the productivity calendaring application 300 to schedule the action items on the calendar in their respective time slots. In operation, the calendaring program 300 begins with the category of highest priority and identifies the task having the highest priority in that category. The calendaring program 300 then begins scheduling a time, within the time slot associated with the corresponding category, to each action item within that task. The action items may also be prioritized, in which case the calendaring program 300 schedules the action items based on their respective priorities. The calendaring program 300 iterates through each action item of each task of each category until all the action items possible have been scheduled.

To illustrate, referring to FIG. 3, action items from work task A 320 and work task B 330 have been assigned to work time slots 360 and 380. In particular, action item A1 321, being the highest priority action item of the highest priority task, is scheduled first in time slot 360 for the estimated completion time associated with action item A1 321. Action item A2 322, being of next highest priority, is scheduled right after action item A1 321, again lasting for its estimated completion time. Likewise, action item A3 323 is scheduled after action item A2 322 and for its estimated completion time. Note that time slot 360 had insufficient time to include action item A3 323, and was therefore scheduled for later that day in time slot 380.

With all the action items in work task A 320 scheduled, the calendaring program begins scheduling action items for the task of next priority, namely work task B 330. Accordingly, the action item having the highest priority in work task B 330 (action item B1 331 in this example) is scheduled on the calendar 350 immediately after action item A3 323. Next, action item B2 332 is scheduled, and finally action item B3 333 is scheduled. Note that in this implementation, each action item may optionally include scheduling instructions (in addition to the estimated completion time) to further refine when the action item is scheduled. More specifically, action item B3 333 includes instructions to only schedule time on Fridays to perform this action item. Thus, action item B3 333 is scheduled for the earliest available time on Friday. This enhancement adds additional flexibility when automatically scheduling tasks.

Figure 4:
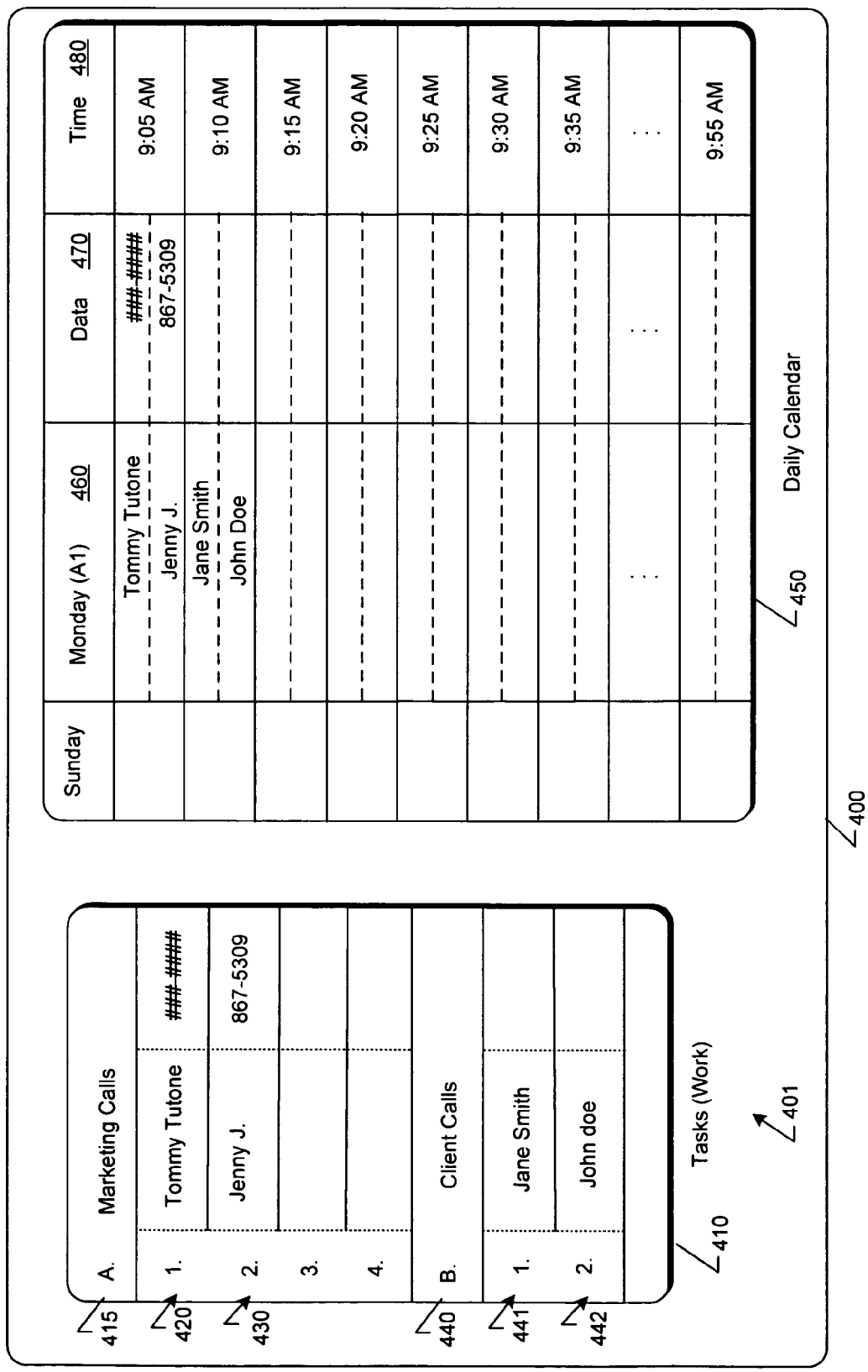
FIG. 4 is still another exemplary user interface dialog screen.

FIG. 4 is an exemplary user interface dialog screen generally illustrating another view of a calendaring program populated with a plurality of tasks to further illustrate one embodiment of the present invention. As shown in FIG. 4, a work tasks category 410 includes a marketing telephone calls task list (task A 415) that further includes a listing of action items. The action items within task A 415 include a prioritized list of the marketing telephone calls that a user needs to make. In this example, a first action item (call 420) identifies an individual or entity, including telephone number, that the user intends to call. A second action item (call 430) identifies a second individual or entity, of lower priority than the first.

A clients telephone calls task list (task B 440) includes action items for telephone calls that the user needs to make to existing clients. As with task A 415, the action items for task B 440 are prioritized, with a call 441 to Jane Smith being ordered higher than a call 442 to John Doe.

As before, when the user instructs, the calendar program 400 automatically schedules each telephone call (i.e., action item) in the task list 401 on the calendar 450. As illustrated, the calls associated with task A 415 are scheduled first, followed by the calls associated with the lower-priority task B 440. Each of the calls is ordered based on their relative priorities per task, and each call (in this example) has an estimated completion time of two and a half minutes (two calls every five minutes).

In this example, the calendar 450 is presented in a "daily view" rather than the weekly view illustrated in FIG. 3. This is done to illustrate that greater detail about each action item may be displayed, in some circumstances, to assist the user to perform the tasks that have been scheduled on the calendar 450. More specifically, by using the system introduced in conjunction with FIGS. 1 and 2, the action items (e.g., action item A1 420 and action item A2 430) on the work tasks category 410 have been scheduled on the calendar 450 based on their relative priorities.

By presenting the calendar 450 in the "daily view" as shown, the user can visually determine each telephone call that must be made in temporal order. In addition, the number to be called is displayed for each call, thus simplifying the performance of the user's task. This view may be preferred when the user is in the act of actually making the calls rather than just scheduling them. In other words, once the calendar program 400 has automatically scheduled each item on the task list 401, the user can turn to a daily view of the calendar 450 and simply begin making the calls in order.

Figure 5:
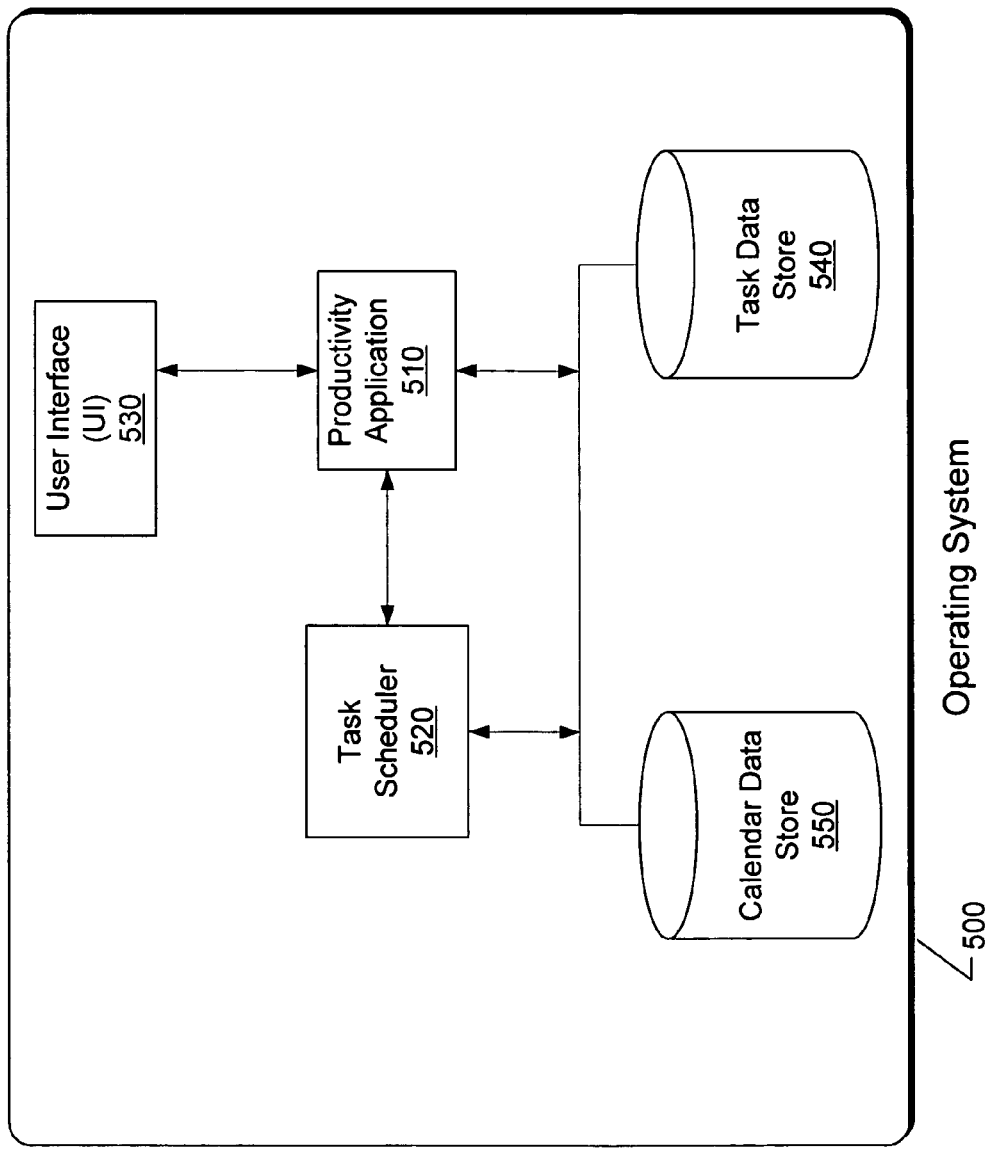
FIG. 5 is a functional block diagram generally illustrating an application execution environment in which implementations of the invention are particularly applicable.

FIG. 5 is a functional block diagram generally illustrating an application execution environment 500 in which implementations of the invention are particularly applicable. Application execution environment 500 may be a computer-readable medium, such as volatile or non-volatile memory, in which resides computer-executable components. Application execution environment 500 includes a productivity application 510 that is in communication with a task scheduler 520 and a user interface (U/I) 530. The productivity application 510 and the task scheduler 520 are in communication with a task data store 540 and a calendar data store 550. Application execution environment 500 may include additional components not relevant to the present discussion.

The productivity application 510 interacts with a user via the U/I 530 to receive instructions from the user related to the capabilities of the productivity application 510. In one embodiment, productivity application 510 interacts with a user via the U/I 530 to receive input defining categories, tasks associated with one or more of the categories, action items associated with one or more of the tasks, and information/data associated with one or more of the action items. The productivity application 510 interacts with the U/I 530 to receive and/or modify this data and information, as well as prioritize the tasks within each category and prioritize the action items within each task. The task-related data received by the productivity application 510 is stored in the task store 540.

Productivity application 510 may also interact with a user via the U/I 530 to receive input defining time slots within a calendaring program. More particularly, the productivity application 510 enables a user to identify and define, via the U/I 530, spans of time (time slots) on a calendar and to associate those time slots with categories that may be created. The time slot data received via the U/I 530 is stored in the calendar data store 550.

Task scheduler 520 is a software engine that receives data from task data store 540 and calendar data store 550 and automatically (or in response to a user instruction) schedules action items from the task data into the corresponding time slots in the calendar data. The task scheduler 520 populates each time slot with action items using the relative priorities of the action items and their related tasks and categories, and estimated completion times for the action items. The productivity application 510 may present the calendar including the scheduled action items to the user via U/I 530.

Figure 6:
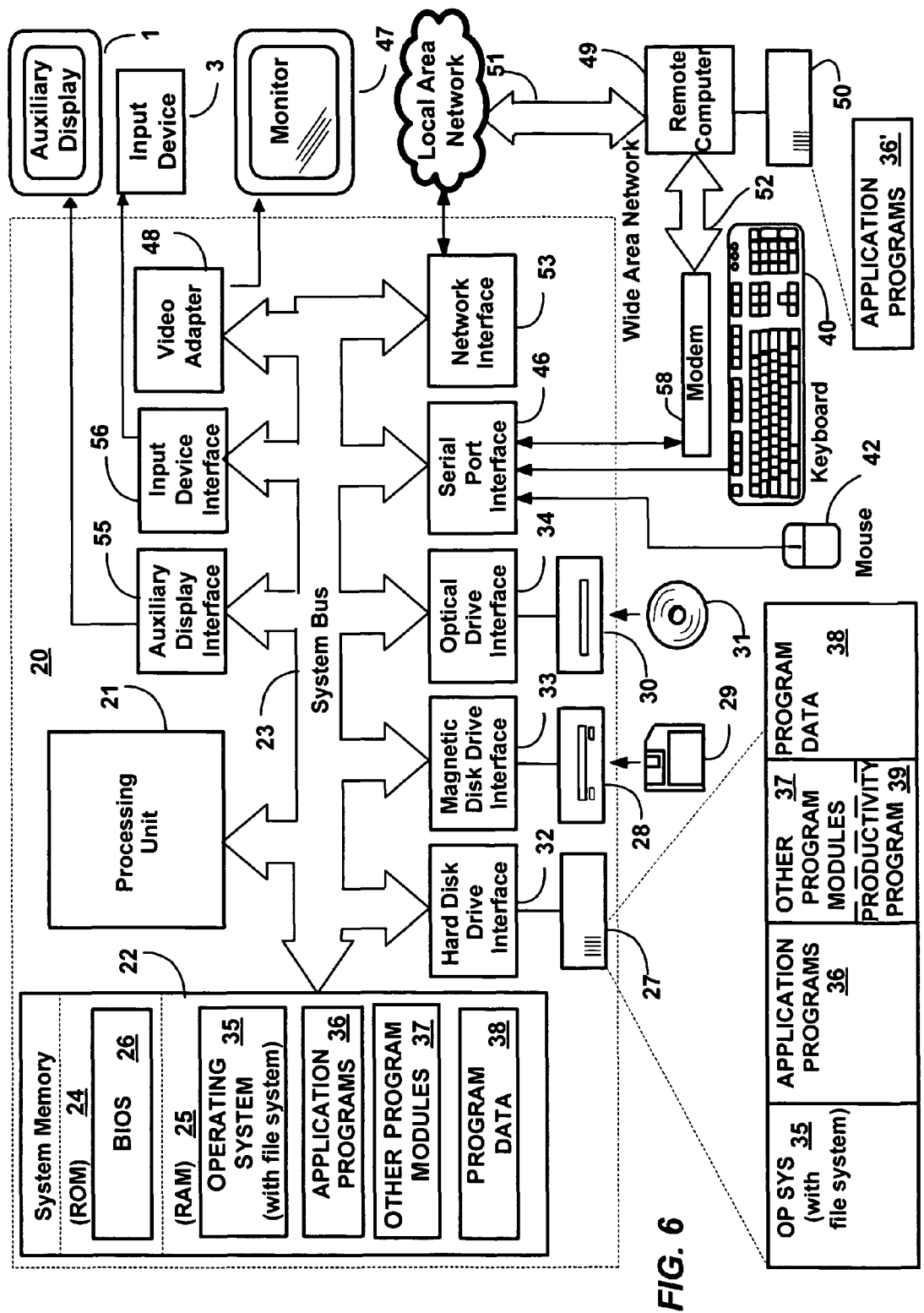
FIG. 6 is a functional block diagram generally illustrating a computing device in which implementations of the invention are particularly applicable.

FIG. 6 is a block diagram representing a computing device 20 in the form of a personal computer system with which the present invention may be implemented. Those skilled in the art will appreciate that the personal computer system 20 depicted is intended to be merely illustrative and that the present invention may be practiced with other computer system configurations, including hand-held devices, multi-processor systems, microprocessor-based or programmable consumer electronics, network PCs, minicomputers, mainframe computers, headless servers and the like. The invention may also be practiced in distributed computing environments where tasks are performed by remote processing devices that are linked through a communications network. In a distributed computing environment, program modules may be located in both local and remote memory storage devices.

The personal computer system 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules and other data for the personal computer 20. Although the exemplary computer system described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs) and the like may also be used in the exemplary computer system.

A number of program modules may be stored on the hard disk, magnetic disk 29, optical disk 31, ROM 24 or RAM 25, including an operating system 35, one or more application programs 36, other program modules 37 including productivity program 39, and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices, such as auxiliary display 1 or speakers and printers (not shown). Auxiliary display 1 is an additional output device connected to the system bus 23 via auxiliary display interface 55, which may be a video adaptor, USB or other peripheral device connection. The input device 3 for controlling the auxiliary display 1 is connected to the system bus 23 via input device interface 56, which may be a serial interface, USB or other peripheral device connection.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20. The logical connections depicted in FIG. 6 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network (LAN) 51 through a network interface or adapter 53. When used in a WAN networking environment, the personal computer 20 typically includes a modem 58 or other means for establishing communications over the wide area network (WAN) 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communications link between the computers may be used and would include a virus detection device implemented in a similar or alternative embodiment as necessitated by the communications link.

Figure 7:
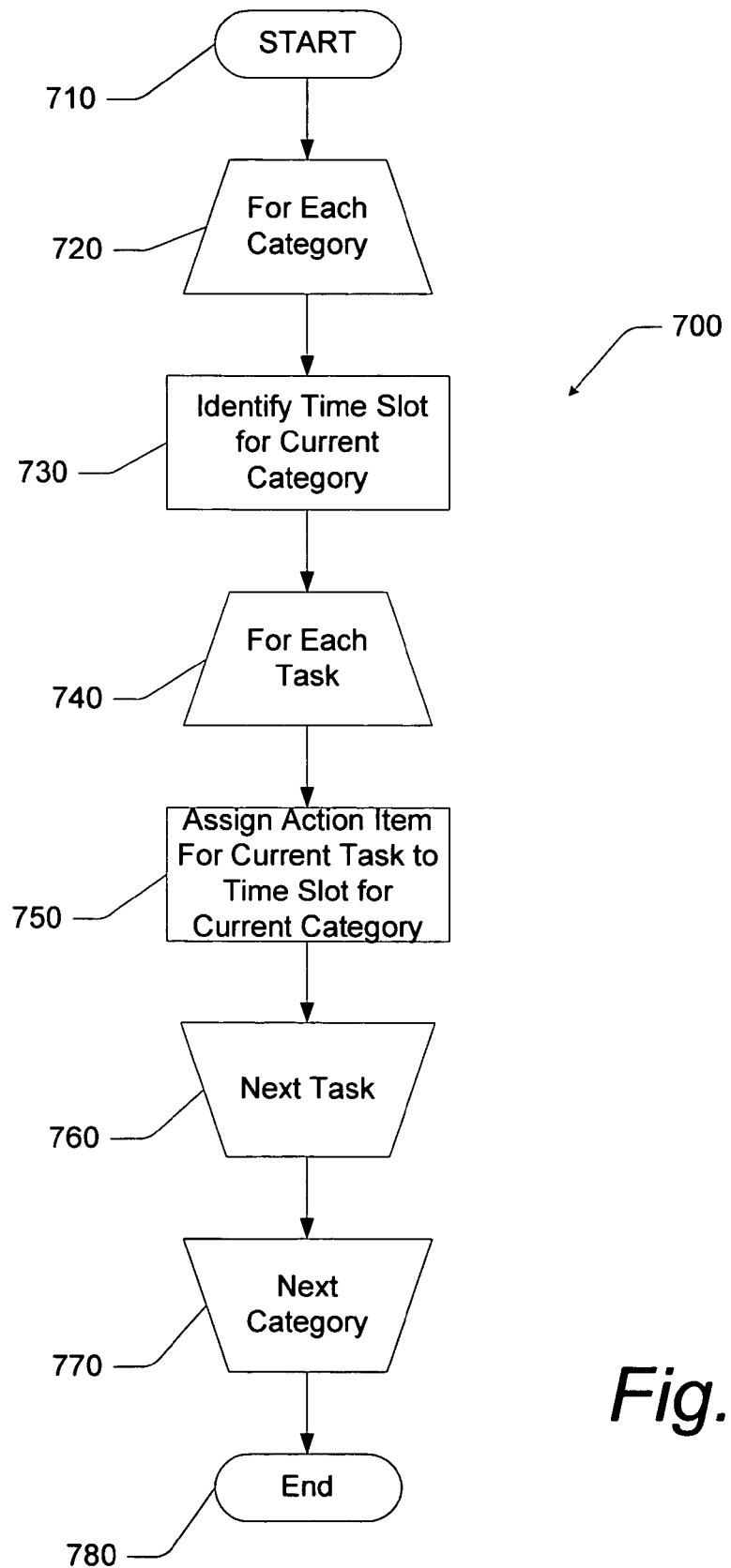
FIG. 7 is an operational flow diagram generally illustrating a process for scheduling tasks within a calendaring framework.

FIG. 7 is an operational flow diagram generally illustrating a method 700 for scheduling tasks on a calendar. In one embodiment, method 700 is implemented with components and data of the exemplary operating environments and exemplary user interface dialog screens of FIGS. 1-6. Preferably, one or more steps of method 700 are embodied in a computer-readable medium containing computer-readable code such that a series of steps are implemented when the computer-readable code is executed on a computing device. In some implementations, certain steps of method 700 are combined, performed simultaneously or in a different order, without deviating from the objective of method 700.

The process 700 begins at step 710, where task data has been received from a user interface. The task data is organized as prioritized action items that make up tasks. Multiple tasks may also be prioritized and aggregated into a common category. In addition, time slots within a calendar have been identified and associated with corresponding categories within the task data.

At step 720, the process 700 enters an iterative loop that operates on each category in the task data. The iterative loop operates on each category in descending order of prioritization as may have been established by the user, or through any other mechanism. Accordingly, the first pass through the process 700, the category having the highest priority is selected as the current category.

At step 730, an appropriate time slot is identified for the current category. It will be appreciated that the appropriate time slot is the time slot that has been associated with the current category.

At step 740, the process 700 enters an iterative loop that operates on each task within the current category. The iterative loop operates on each task in descending order of priority as may have been established by the user, or through any other mechanism. Accordingly, the first pass through the process 700 the task having the highest priority is selected as the current task.

At step 750, each action item within the current task is assigned to the time slot corresponding to the current category. As described at length above, each action item may be scheduled within the time slot in descending order of priority. In other words, each action item for a task is scheduled within the time slot for the current category based on its relative priority. The action item is scheduled on the calendar for the duration of the estimated completion time of the action item. In some embodiments, a buffer period of time (e.g., 10 percent over the estimated completion time) may be added to account for unforeseen contingencies.

At step 760, the current task is incremented to the task having the next lowest priority, and the process 700 returns to step 740. When each task for the current category has been processed according to steps 740-760, the process 700 proceeds to step 770.

At step 770, the current category is incremented to the category having the next lowest priority, and the process 700 returns to step 720. When each category has been processed according to steps 720-770, the process 700 terminates at step 780.

In summary, the above described systems and methods enable a productivity program, such as a calendaring program, to automatically schedule tasks on a user's calendar. More specifically, action items within a task may be automatically scheduled based on relative priorities of the action items. This improves over existing technologies which, at best, only allow the automated scheduling of meetings.

While the present invention has been described with reference to particular embodiments and implementations, it should be understood that these are illustrative only, and that the scope of the invention is not limited to these embodiments. Many variations, modifications, additions and improvements to the embodiments described above are possible. It is contemplated that these variations, modifications, additions and improvements fall within the scope of the invention as detailed within the following claims.

I claim:

1. A method comprising a plurality of computer-executable components for scheduling tasks within a calendaring framework, the method comprises:
    receiving task data associated with a plurality of categories, each category having a relative category priority, the task data comprising a plurality of tasks that are each associated with one of the plurality of categories, wherein a plurality of action items are associated with each task in the plurality of tasks, each action item associated with one task identifies conduct to perform in order to accomplish the associated one task;
    for each of the plurality of categories, assigning a task priority to each task in the category;
    for each task, assigning an action item priority to each action item associated with the task;
    assigning a completion time for each action item, the completion time being an estimate of an amount of time needed to complete the corresponding action item;
    receiving time slot data that designates one or more time slots within the calendaring framework;
    associating at least one category out of the plurality of categories to a corresponding time slot out of the designated time slots; and
    executing a portion of the computer-executable components with a processing unit to schedule action items from each task for each category associated with the time slot, wherein the scheduling of the action items is based on the relative category priority, the action item priority, the task priority, and the completion time and the action items are scheduled in forward temporal order in descending order of priority, wherein the time slot within the calendaring framework is capable of expanding in order to accommodate displaying each of the action items assigned to the time slot.

2. The method of claim 1, wherein receiving time slot data comprises receiving information via a user interface that defines a time span on a calendar.

3. The method of claim 1, wherein scheduling action items from each task is performed in response to a user-initiated operation.

4. The method of claim 1, wherein expanding the time slot within the calendaring framework is based on the resolution of the completion time for the corresponding assigned action items.

5. The method of claim 1, wherein assigning the task priority to each task in the category comprises clicking on each task in an order reflective of the task priority.

6. The method of claim 1, wherein scheduling action items from each task for the category associated with the time slot comprises prioritizing the action items based firstly on the relative category priority for that time slot, then based secondly on the task priority, and lastly based on the action item priority.

7. The method of claim 1, wherein at least one action item specifies a specific day of the week for the conduct to be performed and the at least one action is scheduled in a respective time slot for that specific day of the week.

8. A non-transitory computer-readable medium storing a computer program to schedule tasks within a calendaring framework, the computer program being executed by a computer and comprising:
    computer-readable code to receive task data associated with a plurality of categories, each category having a relative category priority, the task data comprising a plurality of tasks, wherein a plurality of action items are associated with each task in the plurality of tasks, each action item associated with one task identifies conduct to perform in order to accomplish the associated task, each task in the plurality of tasks having a task prioritization value and each action item having an action item prioritization value;
    computer-readable code to assign a completion time for each action item, the completion time being an estimate of an amount of time needed to complete the corresponding action item;
    computer-readable code to receive time slot data from a user interface, the time slot data designating one or more time slots within the calendaring framework and associating each designated time slot with at least one category out of the plurality of categories; and
    computer-readable code to schedule each task within the one or more designated time slots, the scheduling being based on the relative category priority, the task prioritization value and the action item prioritization value, wherein scheduling occurs in a forward temporal order in descending order of priority and wherein the designated time slot within the calendaring framework is capable of expanding in order to accommodate displaying each of the action items associated with the scheduled task assigned to the time slot.

9. The non-transitory computer-readable medium of claim 8, further comprising:
    computer-readable code to receive modified time slot data from the user interface; and
    computer-readable code to modify the associations of a category with the time slots based on reception of the modified time slot data.

10. The non-transitory computer-readable medium of claim 8, further comprising:
    computer-readable code to receive modified task data from the user interface;

computer-readable code to modify the task prioritization value associated with each task based on the modified task data; and
computer-readable code to modify the action item prioritization value associated with each action item based on the modified task data.

11. The non-transitory computer-readable medium of claim 8, further comprising computer-readable code to display the populated calendaring framework on a user interface.

12. The non-transitory computer-readable medium of claim 8, wherein the computer-readable code to schedule each task within the one or more designated time slots that are associated with the same category, comprises:
    computer-readable code to determine time slot availability;
    computer-readable code to determine from the available tasks the task having the highest priority based on the task prioritization value; and
    computer-readable code to assign the task having the highest task prioritization value to the available time slot.

13. The non-transitory computer-readable medium of claim 8, wherein the computer-readable code to schedule each action item within the one or more designated time slots that are associated with the same category, comprises:
    computer-readable code to determine time slot availability;
    computer-readable code to determine from the available action items the action item having the highest priority based on the action item prioritization value; and
    computer-readable code to assign the action item having the highest action item prioritization value to the available time slot.

14. The non-transitory computer-readable medium of claim 8, wherein the computer-readable code to schedule each task within the one or more time slots that are associated with the same category, comprises:
    computer-readable code to identify a time slot associated with a category; and
    computer-readable code to assign the task having the highest task prioritization value to the identified time slot.

15. A computer-implemented method of providing a calendaring framework, the method comprises:
    providing task data distributed into one or more tasks that are each associated with one category out of a plurality of categories, each category having a relative category priority, wherein each task includes a task prioritization value, each task includes a listing of a plurality of action items, each action item including an action item prioritization value and an estimated completion time, and each action item identifies conduct to perform in order to accomplish the associated task;
    providing time slot data, the time slot data defining one or more time slots within the calendaring framework and associating at least one category out of the plurality of categories to at least one time slot; and
    executing instructions of the computer-implemented method via a processing unit to receive a populated calendaring framework that is populated with action items based on an action item location determination, the action item location determination determining a location for each action item within the one or more time slots based on the relative category priority, the action item prioritization value and the estimated completion time, wherein determining the location for each action item occurs in a forward temporal order in descending order of priority, wherein the time slot within the calendaring framework is capable of expanding in order to accommodate displaying each of the action items associated with the time slot.

16. The method of claim 15, wherein the estimated completion time comprises a default value associated with the task data.

17. The method of claim 15, further comprising:
    providing modified time slot data; and
    receiving a modified populated calendaring framework based on the modified time slot data.

18. The method of claim 15, further comprising:
    providing modified task data; and
    receiving a modified populated calendaring framework based on the modified task data.

* * * * *